April 16, 1940.    G. S. KAMMER    2,197,106
INTERNAL COMBUSTION ENGINE WITH SEPARATE COMBUSTION CHAMBERS
Filed July 18, 1938

INVENTOR
Georges S. Kammer
By [signature] Atty.

Patented Apr. 16, 1940

2,197,106

UNITED STATES PATENT OFFICE 2,197,106

INTERNAL COMBUSTION ENGINE WITH SEPARATE COMBUSTION CHAMBERS

George Stephen Kammer, Budapest, Hungary

Application July 18, 1938, Serial No. 219,912
In Germany June 20, 1938

3 Claims. (Cl. 123—33)

The invention relates to internal combustion engines of the type having a separate combustion chamber. Engines of this kind are known in which the flow of air or mixture between the cylinder space and the combustion chamber is regulated by suitably varying the transfer cross-sectional area between these two spaces, so that the pressures occurring in the engine are kept within reasonable limits without waste of power. The constructions of the closure element employed to vary the mentioned cross-sectional area are in some cases difficult to carry out on account of the high temperatures and pressures to be dealt with and the consequent difficulty of cooling and lubrication, so that the engines embodying them are likely to be expensive.

The object of the present invention is to effect the required throttling of the transfer cross-sectional area in an automatic manner, an external control being required only when the engine speed changes, such regulation being, however effected by known regulators. No lubrication of the throttling device is required, since there are no sliding surfaces, and the cooling of the parts subjected to heat can be sufficiently effected by the scavenging or charging air.

According to the invention in an internal combustion engine with separate combustion chamber a single large passage is provided between the combustion chamber and the cylinder and is throttled to the desired extent at and near the upper dead centre of the working piston by a tapered plug attached to the piston. The plug is also provided with an internal passage to connect the combustion chamber and the cylinder, but this passage has a non-return valve, such as a ball valve to permit flow only from the cylinder to the combustion chamber.

To provide for a variation of the throttling when the engine speed changes, the passage between cylinder and combustion chamber is formed in a member rotatable on the axis of the passage and have grooves to enter into register to a greater or less extent with corresponding grooves on the tapered plug according to the position to which the member is rotated by means of an automatic regulator.

The large passage between cylinder and combustion chamber enables the air flow taking place in the cylinder to continue in the combustion chamber. Elements may be arranged in the combustion chamber to distribute the air so flowing in like a sheaf around the jet of fuel so as to assist the mixture of air and fuel.

The drawing serves to illustrate the invention, showing two constructions by way of example. The figures are axial sections through the cylinder head showing only the parts essential to the invention.

Figure 1:
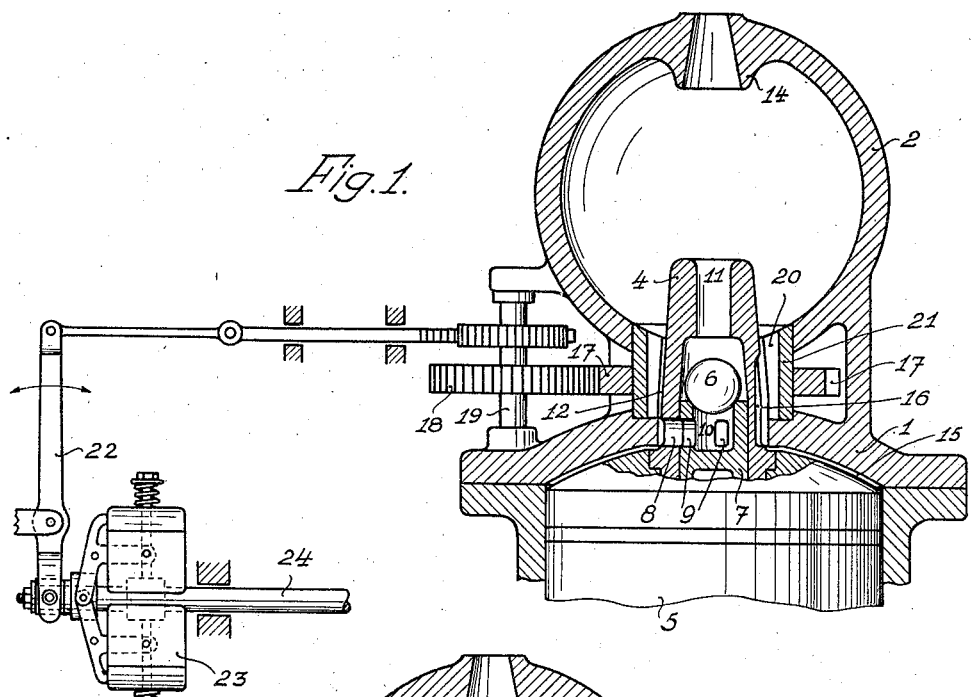
Figure 1 is a view in section partly in elevation, showing a construction in accordance with the present invention.

Referring to Figure 1, the cylinder head 1 contains a combustion chamber 2, in which a fuel nozzle 3 terminates. The latter is preferably of the plug or multi-aperture type, but one which delivers a comparatively narrow cone of fuel.

A conical plug 4 is fixed to the working piston 5, and in the upper dead centre, as shown in the figure, it projects into a connecting passage 12 between the combustion chamber 2 and the cylinder space 15. Inside the plug there is a passage 10, 11 with access ports 8, 9, and in the passage a ball valve 6 with its seating 7 fixed to the plug 4. The ball valve permits free passage from the cylinder to the combustion chamber but not in the reverse direction.

The communication passage 12 is arranged within the member 21, the wall of which is provided with grooves 20 to cooperate with corresponding grooves 16 formed in the conical surface of the plug 4. The member 21 is rotatable on the axis of the passage 12 and bears the toothed ring 17 which engages the gear wheel 18. The shaft 19 on which the latter is mounted is connected by the lever 22 to the centrifugal governor 23 of known type which has its shaft 24 rotated by the main shaft 17 of the engine.

During the compression stroke the passage 12 is at first fully open, so that the air compressed by the piston 5 can flow without hindrance from the cylinder space 15 into the combustion chamber 2. Near the upper dead centre of the working piston 5 the plug starts to enter the passage 12, reducing its cross-section, but the compressed air also enters the ports 8 and 9, raises the ball 6 from its seating 7 and flows through the passage 11 into the combustion chamber 2.

When the pressure rises after the injection of the fuel into the combustion chamber 2, the ball 6 is pressed back onto its seating 7, closing the passage 10, so that the products of combustion can only pass to the cylinder space 15 through the space left between the plug 4 and the neck 13, i. e. the greatly throttled passage 12.

The taper of the plug 4 is so chosen that in the different positions of the working piston 5 such a proportion of the cross-sectional area of the passage 12 remains free that the desired pressure is maintained in the cylinder space 15 by the products of combustion flowing into it from the combustion chamber 2.

If the speed changes, the member 21 is turned a few degrees by the governor 23 so that the register of the grooves 20 with the stationary grooves 16 is varied and with it the transfer cross-sectional area constituted in part by these grooves.

When the piston 5 is at o. near the lower dead centre, that is during scavenging, or in the case of four-cycle engines during the suction stroke, the plug and valve are effectively cooled by the air flowing in. Additional effective cooling is carried out by the jet of fuel entering the combustion chamber, which impinges on the valve ball as well as on the plug. The latter is nevertheless always at a fairly high temperature and to a certain extent acts as ignition means.

The air circulation in the combustion chamber proceeds in a predetermined manner in an engine according to the invention. If the scavenging or charging air has a whirling movement imparted to it on entering the cylinder, it retains such a movement to the end of the compression stroke due to the large transfer cross-sectional area between the cylinder space and the combustion chamber. But as soon as the plug 4 enters the passage 12 an air current is set up in the opposite direction to the fuel jet. This current impinges on the raised rim 14 and is deflected thereby to the periphery of the combustion chamber. The combination of whirling and heart-shaped currents described results in a very effective distribution of the vaporised fuel throughout the charge of air.

The fuel, introduced in a shorter time than would correspond to the specific ignition delay, is thus burnt at once with a great increase of pressure and temperature, so that the necessary excess of air can be reduced and accordingly the output in terms of cylinder volume can be increased. Since the maximum temperatures reached only persist for a short time on account of the rapid or even explosive combustion, any excess of air is not necessary on these grounds and only needs to be sufficient to ensure complete combustion and a smokeless exhaust.

Figure 2:
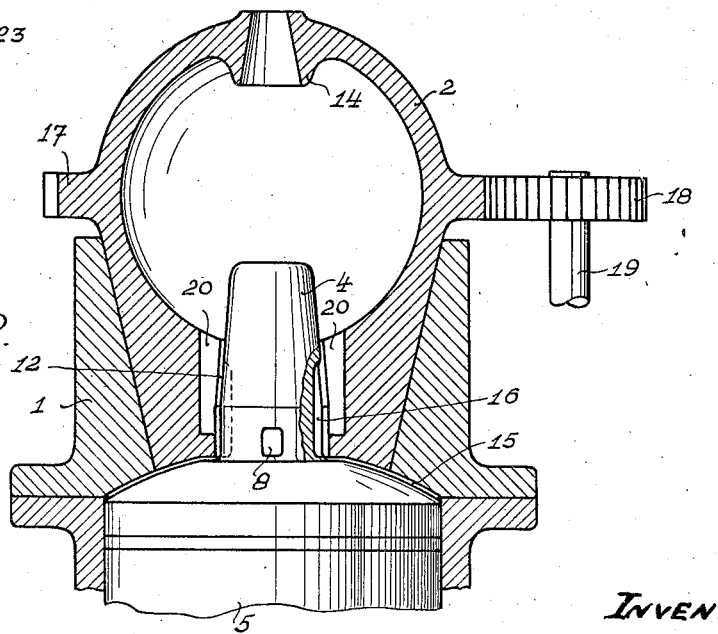
Figure 2 is a sectional view partly in elevation of a modified arrangement.

Referring now to Figure 2, the combustion chamber 2 is rotatable in the cylinder head 1. The members securing the combustion chamber against axial movement are omitted for the sake of clarity. The combustion chamber has a ring of gear teeth 17 cut on its upper part, which engages a gear wheel 18. The shaft 19 on which the latter is mounted is connected to an automatic regulator (e. g. a centrifugal governor) of any known type arranged to move into different positions in accordance with the speed of the engine.

I claim:

1. An internal combustion engine comprising a working cylinder, a piston movable therein, a combustion chamber separate from the cylinder, a member located between said combustion chamber and the cylinder and providing a single large communication passage interconnecting these two spaces, said member being rotatable on the axis of the communicating passage and having at least one longitudinal groove on its inner surface, a tapered plug mounted on the piston, and located to enter the communicating passage when the piston is approaching the inner dead center, said plug having an internal passage and a non-return valve therein permitting flow from the cylinder to the combustion chamber, but not in the reverse direction, the communication between the cylinder space and the combustion chamber being thus substantially unrestricted as long as the piston is near its inner dead center, the throttling being released at a predetermined rate when the piston is moving away from the inner dead center, one longitudinal groove arranged on the plug and adapted to enter into register with the groove on the rotatable member to a varying extent determined by the rotatable position of the latter.

2. An internal combustion engine according to claim 1, wherein means are provided for automatically rotating the member between the combustion chamber and the cylinder in dependence of the speed of the engine.

3. An internal combustion engine in accordance with claim 1 wherein the member between the combustion chamber and the cylinder bears a toothed ring engaging a gear wheel which is connected to a centrifugal governor so as to move the corresponding grooves of the rotatable member on the one hand and of the tapered plug on the other hand into register to a varying extent determined by the engine speed.

GEORGE STEPHEN KAMMER.